(12) United States Patent
Barrett

(10) Patent No.: US 12,190,311 B2
(45) Date of Patent: Jan. 7, 2025

(54) CHAT ABSTRACTION LAYER FOR A PEER-TO-PEER TRANSACTION SERVICE

(71) Applicant: Expensify, Inc., San Francisco, CA (US)

(72) Inventor: David M. Barrett, San Francisco, CA (US)

(73) Assignee: Expensify, Inc., San Francisco, CA (US)

( * ) Notice: Subject to any disclaimer, the term of this patent is extended or adjusted under 35 U.S.C. 154(b) by 0 days.

(21) Appl. No.: 17/954,080

(22) Filed: Sep. 27, 2022

(65) Prior Publication Data

US 2023/0101795 A1   Mar. 30, 2023

Related U.S. Application Data

(60) Provisional application No. 63/250,792, filed on Sep. 30, 2021.

(51) Int. Cl.
| | | |
|---|---|---|
| *G06F 15/16* | (2006.01) | |
| *G06Q 20/22* | (2012.01) | |
| *G06Q 20/36* | (2012.01) | |
| *G06Q 20/40* | (2012.01) | |
| *H04L 51/06* | (2022.01) | |
| *H04L 67/104* | (2022.01) | |

(52) U.S. Cl.
CPC ......... *G06Q 20/363* (2013.01); *G06Q 20/223* (2013.01); *G06Q 20/40* (2013.01); *G06Q 20/401* (2013.01); *H04L 51/06* (2013.01); *H04L 67/104* (2013.01)

(58) Field of Classification Search
CPC .............................. H04L 51/06; H04L 67/104
See application file for complete search history.

(56) References Cited

U.S. PATENT DOCUMENTS

| | | |
|---|---|---|
| 7,089,208 B1 | 8/2006 | Levchin |
| 8,560,353 B2 | 10/2013 | Smith |
| 8,762,272 B1 | 6/2014 | Cozens |
| 8,769,417 B1 | 7/2014 | Robinson |
| 9,043,407 B1 | 5/2015 | Gaulke |
| 9,245,296 B2 | 1/2016 | Nuggehalli |
| 9,275,418 B2 | 3/2016 | Johansen |
| 9,595,031 B1 | 3/2017 | Grassadonia |
| 9,773,232 B1 | 9/2017 | Grassadonia |

(Continued)

FOREIGN PATENT DOCUMENTS

| | | |
|---|---|---|
| GB | 0621189.0 | 12/2006 |
| WO | WO-2007/064879 A2 | 6/2007 |

(Continued)

OTHER PUBLICATIONS

International Search Report and The Written Opinion of The International Searching Authority mailed Apr. 19, 2023, for related PCT/US2022/045106 filed Sep. 28, 2022, 15 pages.

*Primary Examiner* — Oleg Survillo
(74) *Attorney, Agent, or Firm* — Mahamedi IP Law LLP

(57) ABSTRACT

A computing system can provide an interface for users of a messaging service to exchange messages with other users of the messaging service. The system can associate each exchange of messages with an underlying document, and structure the underlying document of each message exchange so that each message as a comment that is embedded or linked to the document.

16 Claims, 7 Drawing Sheets

(56) References Cited

U.S. PATENT DOCUMENTS

| | | |
|---|---|---|
| 9,792,600 B1 | 10/2017 | Grassadonia |
| 9,892,400 B1 | 1/2018 | Grassadonia |
| 10,115,083 B1 | 10/2018 | Koeppel |
| 10,540,646 B2 | 1/2020 | Schlosser |
| 10,540,724 B2 | 1/2020 | Whitley |
| 10,552,808 B1 | 2/2020 | Grassadonia |
| 10,915,872 B1 | 2/2021 | Bickerstaff |
| 10,990,997 B1* | 4/2021 | Hayes ................ G06Q 20/202 |
| 11,321,560 B2 | 5/2022 | Jennings |
| 11,475,447 B2* | 10/2022 | Main .................... G06Q 20/401 |
| 11,514,421 B2 | 11/2022 | Grassadonia |
| 11,526,875 B1* | 12/2022 | Shetti ................ G06Q 20/0655 |
| 11,663,655 B2 | 5/2023 | Benkreira |
| 2008/0046347 A1 | 2/2008 | Smith |
| 2009/0281948 A1 | 11/2009 | Carlson |
| 2012/0221446 A1 | 8/2012 | Grigg |
| 2013/0204834 A1 | 8/2013 | Forsee, II |
| 2013/0311447 A1 | 11/2013 | Liensberger |
| 2014/0052633 A1* | 2/2014 | Gandhi .................. G06Q 40/02 705/44 |
| 2014/0081847 A1 | 3/2014 | King |
| 2014/0122618 A1 | 5/2014 | Duan |
| 2016/0006750 A1 | 1/2016 | Yang |
| 2016/0042420 A1* | 2/2016 | Purcell ............... G06Q 30/0613 705/26.41 |
| 2016/0094506 A1 | 3/2016 | Harden |
| 2016/0099892 A1 | 4/2016 | Palakovich |
| 2017/0230312 A1 | 8/2017 | Barrett |
| 2018/0005215 A1* | 1/2018 | Delaney ............ G06Q 20/4016 |
| 2018/0005216 A1* | 1/2018 | Delaney ............... G06Q 20/381 |
| 2019/0102813 A1* | 4/2019 | O'Neill ..................... H04L 51/52 |
| 2019/0312969 A1* | 10/2019 | Honoré ................... H04M 3/42 |
| 2020/0090163 A1 | 3/2020 | Brown |
| 2020/0143373 A1 | 5/2020 | Chen et al. |
| 2021/0201380 A1* | 7/2021 | Belcher ............. G06Q 30/0631 |
| 2021/0406984 A1* | 12/2021 | Fredrich ............ G06Q 30/0633 |
| 2022/0092583 A1* | 3/2022 | Ur ....................... H04M 3/2281 |
| 2022/0180364 A1 | 6/2022 | Peled |
| 2022/0405776 A1* | 12/2022 | Tietzen .............. G06Q 30/0201 |
| 2023/0025638 A1* | 1/2023 | Gandhi ................. H04L 65/403 |
| 2023/0033328 A1* | 2/2023 | Pal ........................... G06F 40/30 |
| 2023/0385924 A1* | 11/2023 | Eidam ................... G06F 3/0488 |

FOREIGN PATENT DOCUMENTS

| | | |
|---|---|---|
| WO | WO-2012/116125 A1 | 8/2012 |
| WO | WO-2016/024183 A2 | 2/2016 |
| WO | WO-2016/068854 A1 | 5/2016 |
| WO | WO-2022/103623 A1 | 5/2022 |

* cited by examiner

CHAT ABSTRACTION LAYER FOR A PEER-TO-PEER TRANSACTION SERVICE

CROSS-REFERENCE TO RELATED APPLICATION

This application claims the benefit of priority to U.S. Provisional Patent Application No. 63/250,792, filed on Sep. 30, 2021, which is hereby incorporated by reference in its entirety.

BACKGROUND

Automated transaction processing through linked accounts involves the use of a transaction application that enables users to input an identifier of another user (e.g., a name, email address, or phone number) to request or transfer amounts between users.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
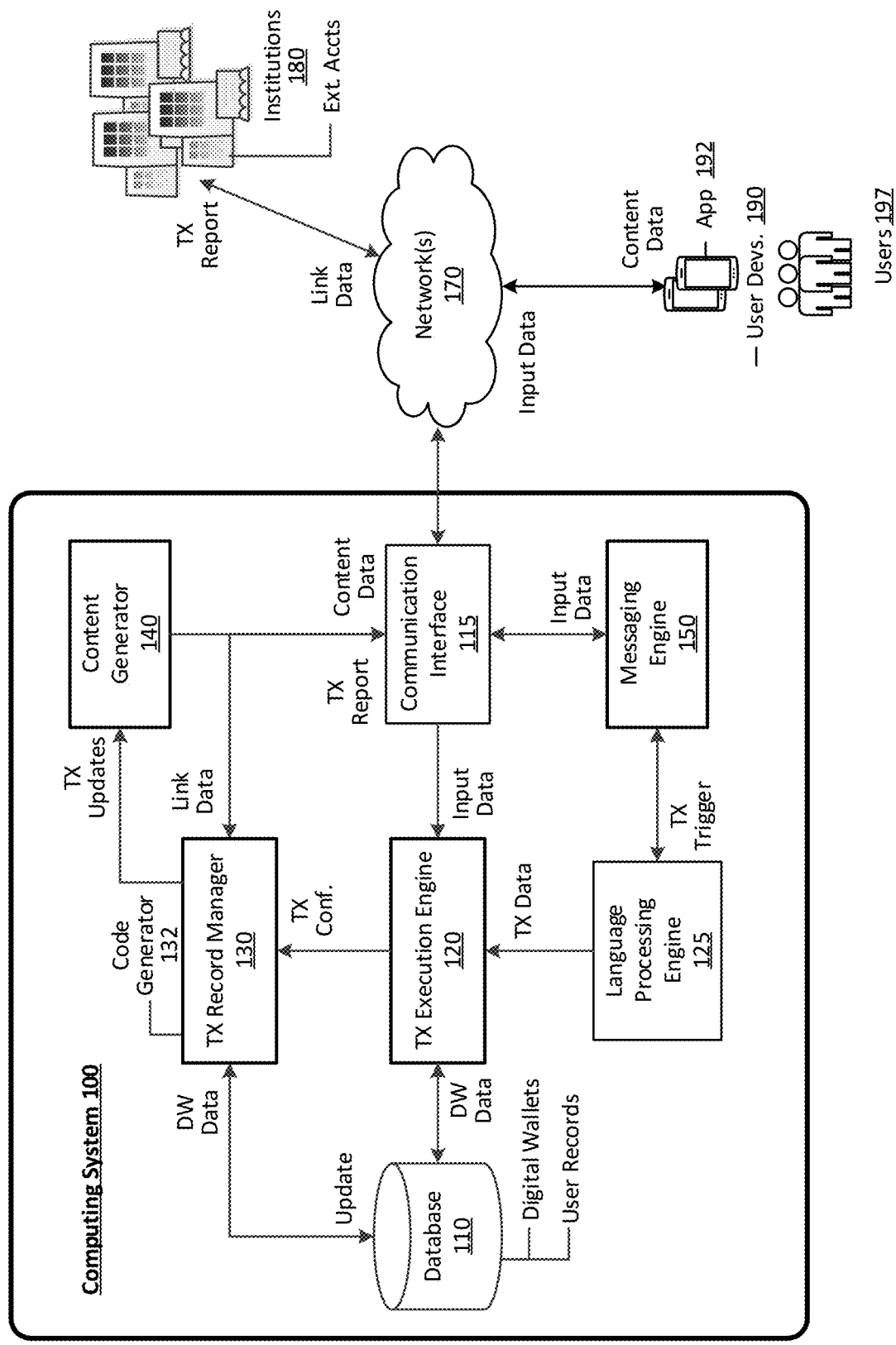
FIG. 1 is a block diagram illustrating an example computing system implementing an automated peer-to-peer (P2P) transaction service, in accordance with examples described herein.

A computing system can implement an automated P2P transaction service that enables users to link external accounts with a digital wallet for P2P transactions, where the digital wallet may be unique to the P2P transaction service. The computing system communicates, over one or more networks, to computing devices of a plurality of users of the transaction service, and maintains the digital wallet for each respective user of the plurality of users by connecting at least one external account of the respective user to the digital wallet. In various examples, the computing system can connect with computing systems of financial institutions to link the externals accounts with the users' digital wallets by collecting personal information of each user (e.g., name, address, phone number, SSN, etc.) and generating a unique, random code to associate the digital wallet of the respective user with the external account of the respective user.

Based on the unique attributes of the respective user, the computing system can transmit, over the one or more networks, display data to a computing device of the respective user. The display data can cause a customized user interface (UI) for the respective user to be displayed on a display screen of the user's computing device to enable the respective user to access and utilize the digital wallet to direct transactions with other users. The customized, interactive UI can comprise at least a selectable authorization feature to automatically authorize transactions from the digital wallet, and a transaction request feature to configure transaction requests for other digital wallets of the transaction service. In some aspects, the user's design and display preferences, available balance, contact list, and other customized features can be presented via the customized UI.

In various examples, the computing system can receive, over the one or more networks, authorization data indicating a selection by the respective user of the selectable authorization feature in connection with a received transaction request from a computing device of a second user, where the second user has a second digital wallet associated with the transaction service. Based on the authorization data, the computing system can automatically execute a transaction from the digital wallet of the respective user to the second digital wallet of the second user in an amount indicated in the received transaction request.

As provided herein, the external account of the respective user can be associated with a financial institution (e.g., a bank account, checking account, credit account, etc.). For each financial institution, the computing system can generate a unique identifier for the financial institution to indicate transactions made via the automated P2P transaction service and for generating reconciliation records or periodic reports for the financial institution. In such implementations, the computing system can map transaction data of the transaction service with transaction records of the financial institution, and transmit the records or reports via a secure file transfer protocol (e.g., daily).

In various examples described herein, a computing system is described that provides a messaging service enabling users of a transaction service to transmit and receive messages in connection with the automated P2P transaction service. In providing the messaging service, the computing system can identify, within exchanged messages between a first user and a second user of the messaging service, one or more transaction triggers indicating a transaction request by the first user. Based on identifying the transaction trigger(s) within the exchanged messages, the computing system can automatically execute a transaction from a digital wallet of the second user to a digital wallet of the first user.

According to certain implementations, the computing system can generate a transaction record of the transaction based at least in part on comments or messages in a chat between two or more users. In further implementations, the transaction trigger can indicate a transaction date and a transaction amount, and the computing system can automatically execute the transaction for the transaction amount on the transaction date. In still further implementations, the transaction trigger can include an affirmation or agreement by the second user to execute the transaction.

The computing system can identify the transaction trigger within the chat through various detection methods, such as processing each chat based on a set of trigger words (e.g., text processing), and/or by executing natural language processing on the chat. In additional examples, the chat can comprise a voice chat between the first user and the second user, and the computing system can execute natural language processing on the voice chat, enabling the computing system to identify the transaction amount, the transaction date, and/or the affirmation by the second user using, for example, speech-to-text processing. In certain implementations, the chat or messaging service can be linked to an underlying document, such as an invoice or expense report, which can form the basis of a transaction record to which at least the transaction trigger aspects of the chat can be included automatically.

In various examples, the exchanged messages can be based on or can correspond to comments provided with the underlying document. In such examples, the computing system can archive the underlying document with comments that correspond to one or more of the exchanged messages, and/or a record of the executed transaction. Additionally, the computing system can process the underlying document to determine one or more parameters of the transaction, such as an amount owed, a due date for the transaction, any write-offs for the transaction, current payment amount, and the like.

Additionally or alternatively, the computing system can provide an interface for users of the messaging service to exchange messages with other users of the messaging service, associate each exchange of messages with one or more underlying documents (e.g., an attachment or a subject of the chat), and structure the underlying document of each message exchange so that each message comprises a comment that is embedded or linked to the underlying document. In such examples, the messaging service can comprise an abstraction layer of the automated P2P transaction service. As such, the messaging service can operate as a normal messaging service in which multiple users can simply communicate with each other, or can be triggered to operate as at least a part of transaction record that is automatically compiled (e.g., for inclusion in an underlying document or transaction record) and utilized as a transaction trigger by the computing system to automatically execute digital wallet transactions between users.

Current automated transaction methods involve direct payments or requests through applications in which accounts are linked and payees and payors are identified through a contact list, email address, or phone number. However, such transfers are wholly configured and initiated by the two users without a level of automation with regard to automatic triggers for executing transactions, and automatic record keeping and documentation integration. Examples described herein provide a technical improvement over current transaction services by implementing automated message processing to determine transaction triggers, automatically executing transactions without the need for user configuration when all necessary information is present, and automatic report generating and document integration with messaging for transaction recordation.

As used herein, a computing device can refer to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method.

Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, network equipment (e.g., routers), and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions.

Examples of non-transitory computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Chat-Based Transaction Automation System

FIG. 1 is a block diagram illustrating an example computing system 100 implementing an automated peer-to-peer (P2P) transaction service, in accordance with examples described herein. In various implementations, the computing system 100 includes a communication interface 115 that communicates, over one or more networks 170, with computing systems of financial institutions 180 managing external accounts of users 197 of the transaction service. Additionally, the communication interface 115 communicates with the computing devices 190 of the users 197 (e.g., via an executing transaction service application 192). In an initial setup process, a transaction record manager can receive link requests and link data from the financial institutions 180 to create and/or manage digital wallets for the users 197 (e.g., in a database 110 of the computing system 100)

In various implementations, the transaction record manager 130 can receive the personal information of a user 197, which can include the user's name, address, SSN, and external account information for linking the digital wallet of the user 197 with the user's external account(s). In some examples, the transaction record manager 130 can execute a code generator 132 that generates a randomized code representing the digital wallet, or each external account linked to a digital wallet, in the database 110 and/or the external account of the user 197 at the financial institution 180. Once the user's external account is linked with the digital wallet, the user 197 may utilize the P2P transaction service implemented by the computing system 100 by configuring transaction requests, receiving payments from other users 197, and making wallet-to-wallet transfers with other users 197.

In certain examples, the computing system 100 can include a content generator 140 that, based on the unique information of the user 197, external account information, available digital wallet balance, current balance, and the like, can generate a customized user interface for presentation on the computing device 190 of the user 197 (e.g., via an executing application 192 specific for the transaction service, or website). In certain examples, the content generator 140 can update various content elements on the customized user interface based on transaction updates received from the transaction record manager 130. For example, each time a transaction is made to or from the user's digital wallet, the content generator 140 can generate updated content elements, animations, etc. indicating details of the transaction and any new updated balances for the digital wallet and/or external account of the user 197.

Once the user's external account is linked with the digital wallet, the user 197 can configure wallet-to-wallet transaction requests, receive payments from other digital wallets, etc. In some examples, the user 197 can utilize the P2P transaction service to receive payment for invoices, IOUs, and have automatic expense reports and transaction records generated by the transaction record manager 130 of the computing system 100. Specifically, a user 197 can execute a designated P2P transaction application 192 on the user's computing device 190 to access the transaction service, configure transaction requests and transmit the transaction requests to the computing device of another user 197. Upon receiving an input indicating authorization from the second user 197, the transaction execution engine 120 of the computing system 100 can execute a transfer between the digital wallets of the two users 197.

For each transaction, the transaction record manager 130 can update the user records in the database 110 in order to maintain consistent and accurate records for each user 197 and each financial institution 180. As provided herein, the transaction record manager 130 can generate on-demand transaction reports for all digital wallets linked to the external accounts managed by a given financial institution 180 (e.g., a bank).

In various examples, the transaction record manager 130 can periodically generate a reconciliation report for a given financial institution 180 using a dedicated code representing that financial institution 180. The periodically generated reconciliation report can indicate all transactions made over a given period (e.g., each month, week, or business day) with digital wallets linked to the external accounts managed by the financial institution 180. In one aspect, the periodic reconciliation report maps each field of the periodic report to the unique fields of the financial institution's own records. Furthermore, the transaction record manager 130 can maintain a continuous link, or periodically link with the external account(s) corresponding to each digital wallet to maintain timely and accurate balance information for each digital wallet.

On the user 197 side, a technical improvement to existing transaction methods involves the automated, message-driven transaction execution process implemented by a messaging engine 150, a language processing engine 125, and a transaction execution engine 120 of the computing system 100. The messaging engine 150 provides a chat platform for the users 197 of the P2P transaction service, enabling the users 197 to send and receive messages to each other (e.g., upon connecting via a contact list, friend acceptance process, phone number or email identification process, or other secure verification process). Furthermore, the chat platform provided by the messaging engine 150 enables users 197 to attach underlying documents and/or associate a particular chat thread with an underlying document, such as an IOU or an invoice.

In various implementations, the language processing engine 125 can execute text processing (e.g., optical character recognition) on underlying documents linked to a chat thread to identify amounts owed between two users 197. For example, a chat can be initiated between two users 197 in which an invoice or IOU is associated with the chat. The messaging engine 150 can receive input data corresponding to the messages transmitted between the users 197 and update the chat thread with content data corresponding to the messages accordingly. The language processing engine 125 can process the messages between the users 197 to identify whether the users 197 are discussing a transaction or amount to be transferred between the users 197.

The language processing and messaging functions of the P2P transaction service can operate as an abstraction layer of the P2P transaction service. As such, the language processing engine 125 can monitor any given chat between two users 197 for transaction triggers, which can comprise the information needed in order for the transaction execution engine 120 to automatically execute a transaction between two or more users 197. In various examples, the transaction trigger can comprise a transaction amount (e.g., as identified on an underlying document, such as an invoice, IOU, receipt, camera image, etc.), a comment indicating the payee and/or payor, a transaction date, and/or an affirmation from the payor.

As an example, a first user 197 can initiate a chat with a second user 197 and attach or associate the chat with an invoice or IOU, which can be processed by the language processing engine 125 to determine a transaction amount and/or a transaction date. Upon detecting an affirmation from the second user 197 (e.g., a message in the chat stating "OK" or "no problem"), the language processing engine 125 can transmit the transaction data to the transaction execution engine 120, which can automatically transfer the transaction amount from the digital wallet of the second user 197 to the digital wallet of the first user 197 on the transaction date indicated on the invoice (if relevant).

As another example, the first user 197 can initiate a chat indicating that the second user 197 owes a transaction amount in a message. The language processing engine 125 can identify the transaction amount in the message, and upon the second user 197 affirming that the amount is owed, the language processing engine 125 can transmit the transaction data indicating the amount and the users 197 (e.g., payer/ payee) to the transaction execution engine 120. The transaction execution engine 120 may then automatically execute the transaction between the digital wallets of the first and second users 197.

In further implementations, the messaging engine 150 can provide voice and/or video call functions on the chat platform. The language processing engine 125 can perform audio processing techniques, such as voice-to-text processing, to identify a transaction trigger in a voice or video conversation between two users 197. Upon detecting the transaction trigger(s)—indicating an amount owed from a second user 197 to a first user 197 and an affirmation from the second user 197—the transaction execution engine 120 can automatically perform the wallet-to-wallet transfer in the amount owed from the second user 197 to the first user 197.

As provided herein, the transaction record manager 130 can generate a record for each transaction, integrating the messages between the users 197 with any underlying document corresponding to any given transaction. As such, the transaction execution engine 120 can transmit a confirmation that a transaction was executed to the record manager 130, which can compile the relevant messages indicating the transaction data (e.g., amount, payor, payee, date, etc.) into the transaction record.

Accordingly, every P2P transaction made can be associated with a transaction record compiled by the record manager 130, which is stored in the database 110 and associated with each relevant user 197 that is party to the transaction. Relevant portions of a chat conversation that include the transaction data necessary to trigger the execution engine 120 to instigate a wallet-to-wallet transaction can be integrated by the record manager 130 with an underlying document, such as an IOU or invoice. In doing so, the record manager 130 can identify a source record for each transaction—which can comprise an underlying document or a chat conversation—and integrate the source record with the transaction data from the messages between two or more users 197. Thus, any transaction between parties can be backed by documentation compiled automatically by the computing system 100 and stored in the records database 110.

User Computing Device

Figure 2:
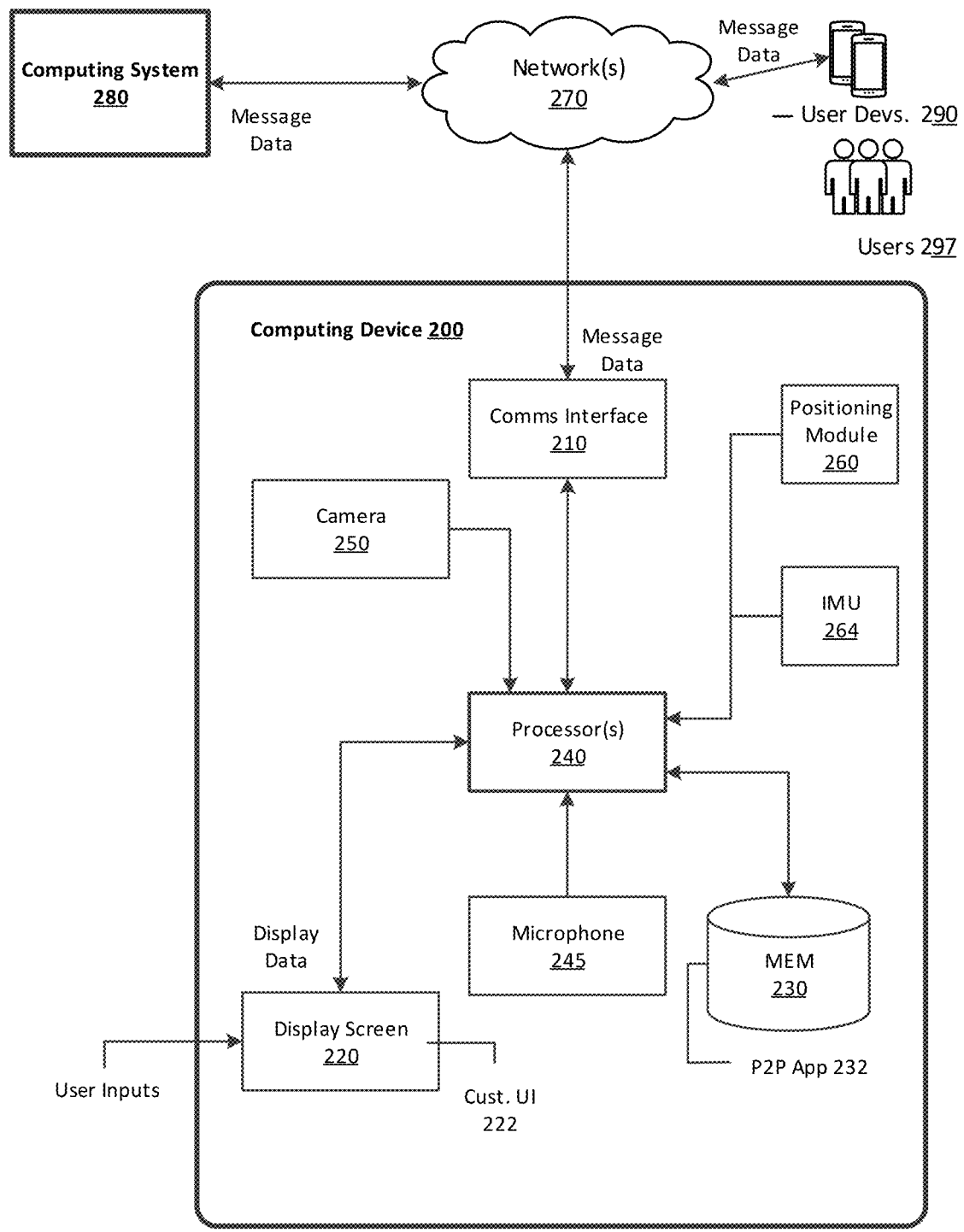
FIG. 2 is a block diagram illustrating a computing device executing a designated application for enabling users to utilize messaging and automated transactions services implemented by an example computing system, according to various examples.

FIG. 2 is a block diagram illustrating a computing device executing a designated application for the P2P transaction service, according to various examples. In many implementations, the computing device 200 can comprise a mobile computing device, such as a smartphone, tablet computer, laptop computer, VR or AR headset device, and the like. As such, the computing device 200 can include telephony features such as a microphone 245, a camera 250, and a communication interface 210 to communicate with external entities using any number of wireless communication protocols (e.g., Wi-Fi, Bluetooth, BLE, etc.). In variations, the computing device 200 can comprise a personal computer having a keyboard, mouse, and one or more monitors.

The computing device 200 can further include a positioning module 260 and an inertial measurement unit 264 that includes one or more accelerometers, gyroscopes, or magnetometers. In certain aspects, the computing device 200 can store a designated service application 232 in a memory 230. In variations, the memory 230 can store additional applications executable by one or more processors 240 of the computing device 200, enabling access and interaction with one or more host servers over one or more networks 270.

In accordance with examples provided herein, the processor 240 can execute the designated P2P transaction application 232 to communicate with the P2P transaction system 280 and the computing devices 290 of other users 297, as described above with respect to FIG. 1. In various implementations, execution of the transaction application 232 can cause the display screen 220 to present a customized user interface 222 that is unique to the user. The user interface 222 enables the user to access and interact with the messaging platform to communicate with other users 297 by creating chat threads, transmitting and receiving messages, making voice calls, making video calls, and the like. The user interface 222 further provides access to the P2P transaction service, in which the user may configure transaction requests, receive digital wallet payments from other users 297, and send digital wallet payments to other users 297.

As provided herein, execution of the application 232 causes the customized, interactive user interface 222 to present a chat contact list, chat features enabling underlying document association (e.g., attachment, link, image post, etc.), and a P2P transaction panel or page enabling direct execution of P2P transactions. As further provided herein, message data corresponding to chats between multiple users 297 can be transmitted to the computing system 280 for language processing in order to detect transaction triggers within a particular chat, automatically execute transactions based on the transaction triggers, and automatically generate a transaction record that integrates at least the relevant transaction data within a chat with an underlying document, such as an invoice, receipt, IOU, image, and the like. Further description of the customized, interactive user interface is provided below with respect to FIG. 3.

Interactive User Interface

Figure 3:
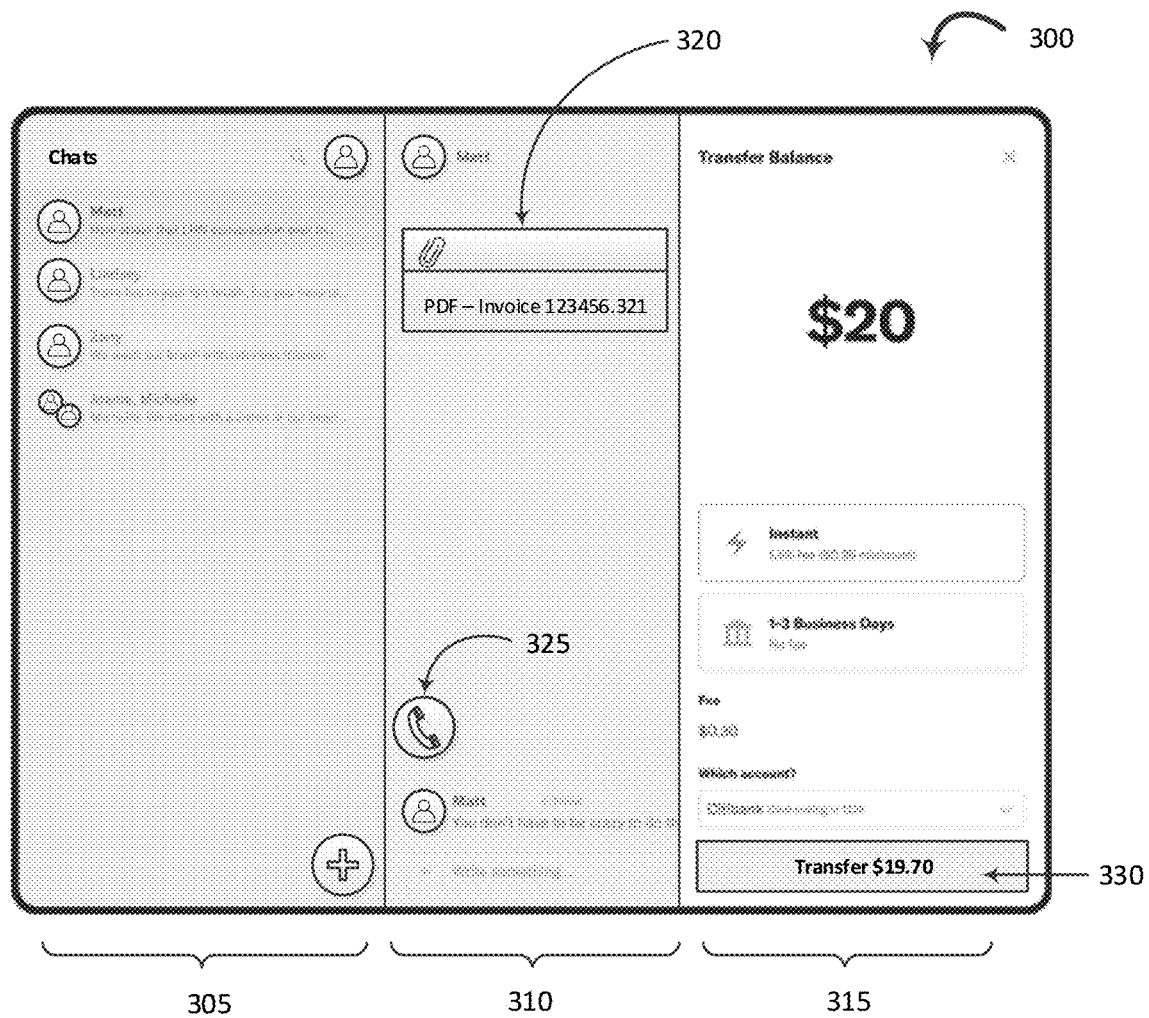
FIG. 3 illustrates an example interactive user interface provide access to the automated P2P transaction service, according to examples described herein.

FIG. 3 illustrates an example interactive user interface provide access to the automated P2P transaction service, according to examples described herein. Referring to FIG. 3, an interactive user interface 300 is generated on the display screen of a user's computing device upon execution of a designated P2P transaction application, such as the application 192, 232 described with respect to FIGS. 1 and 2. In variations, the user interface 300 can be generated via access to a dedicated website for the P2P transaction service described throughout the present disclosure. As described herein, the user interface 300 can be custom generated and unique to the user's personal information, external account links, contacts, and chats.

In various implementations, the user interface 300 includes a messaging panel or page 305 that enables the user to continue current chats or configure new chats. The user interface further includes an interactive chat panel or page 310 that enables the user to associate the chat with an underlying document 320, which can comprise an attachment, link, image, and the like. As provided herein, the current chat of the user presented in panel 310 can comprise comments to the underlying document, general messages between the two users, comments altering the transaction details of the underlying document 320 (e.g., an agreement between the two users to revise an owed amount or transaction amount), specifics regarding the date of transaction, and the like.

In further implementations, the interactive interface 300 enables the user to make voice or video calls by selection of a call feature 325, which, for example, allows the users to discuss the details of the underlying document 320 or an upcoming transaction. In various examples described herein, the information in the chat between the user and the second user can be automatically processed by the language processing engine 125 of the computing system 100 described in connection with FIG. 1. In doing so, the computing system 100 can monitor the chat for transaction triggers, for example, by identifying keywords that confirm agreement to a transaction between the two users.

In further examples, the computing system 100 can perform text processing on the underlying document 320 to determine potential transaction details for a subsequent transaction between the two users, such as an amount owed, the payor versus the payee, a transaction date, and the like. In still further examples, the computing system 100 can perform voice or audio processing techniques, such as voice-to-text speech recognition, to further identify any transaction details, such as revisions to the amount owed, and/or an affirmation by the payor that can cause the transaction to be automatically executed.

Examples described herein further include direct P2P transaction functions represented in panel 315. A technical improvement over current implementations of direct P2P transactions is the association and automatic integration with an underlying document 320. For example, the user can associate a chat or a direct P2P transaction request with the underlying document 320 prior to executing the transaction. In an example represented by FIG. 3, the user has received a P2P transaction request from a second user with an invoice document 320 attached. In one example, the language processing functions of the computing system 100 can identify a transaction amount of $19.70 and automatically present an execution feature 330 that enables the user to initiate the transaction.

Accordingly, in addition to the direct transaction implementations of current embodiments—in which users can identify each other via an email address or phone number and configure payments manually—the automated P2P transaction service described in the present disclosure integrates text or language processing on messages in a chat for determining transaction details and triggers, automates transaction execution when all necessary information is detected, and provides automatic document-chat integration for generating transaction records. Implementations described herein provide automated transaction features that enable auto-population of transaction fields and automated transaction execution using technical language processing and record management techniques described throughout the present disclosure.

Methodology

Figure 4:
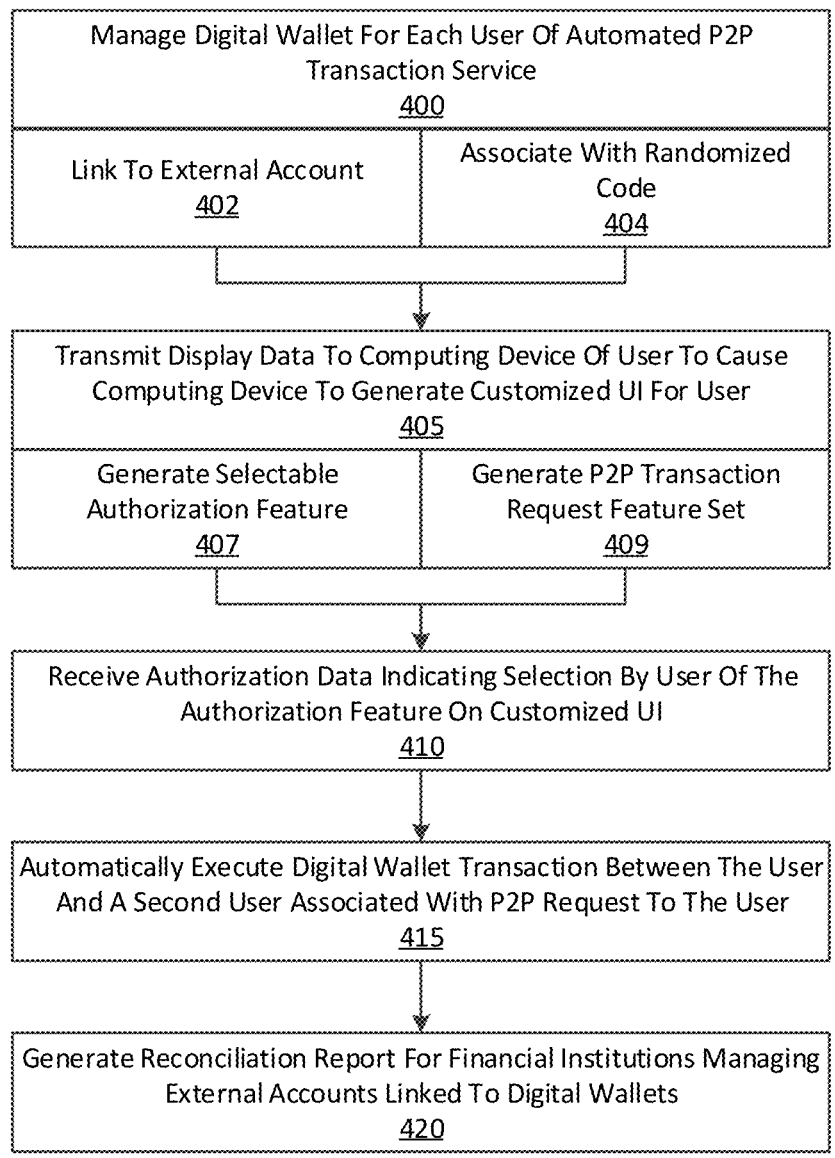
FIG. 4 is a flow chart describing an example method of implemented an automated P2P transaction service, according to various examples.
Figure 5:
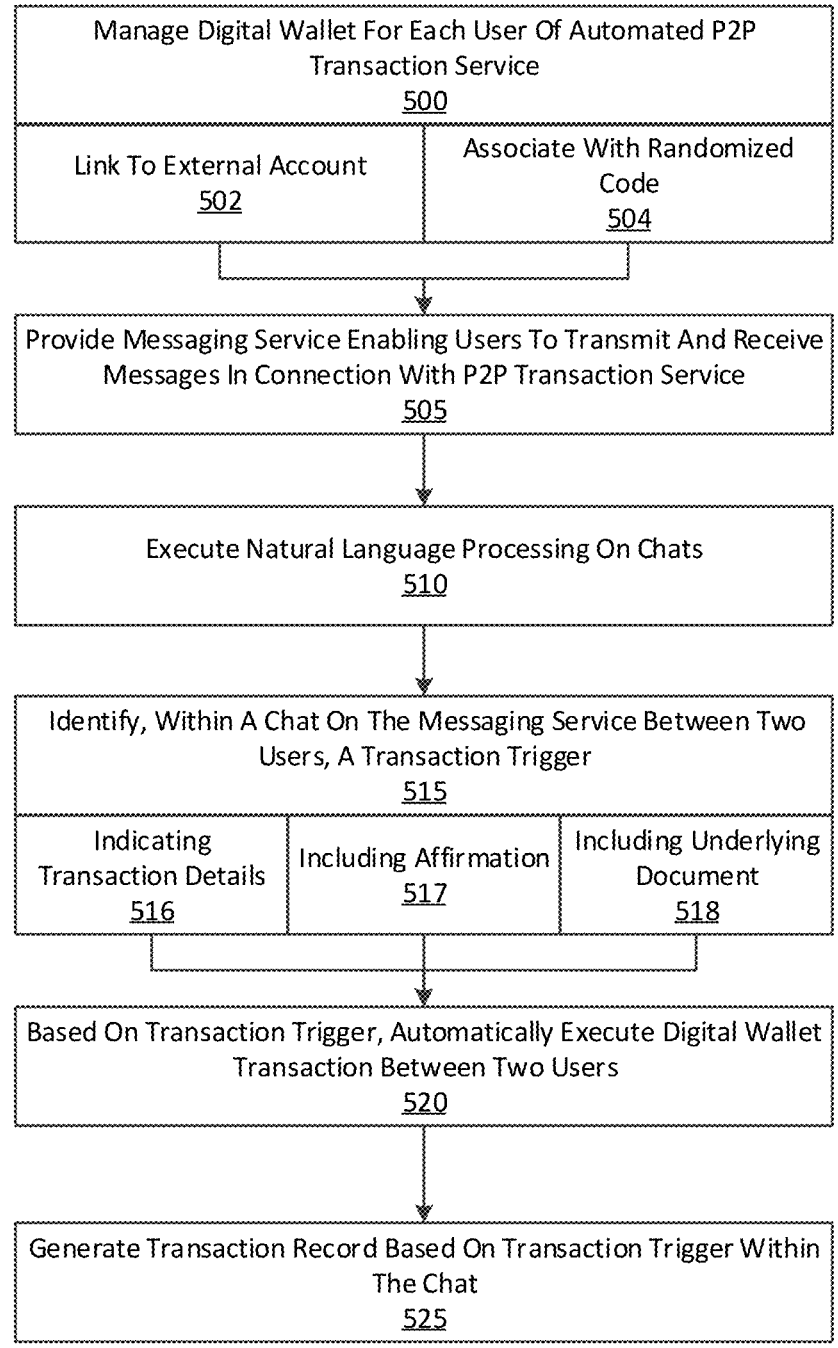
FIG. 5 is a flow chart describing an example method of automated transaction execution based on transaction triggers of a messaging service, according to examples described.
Figure 6:
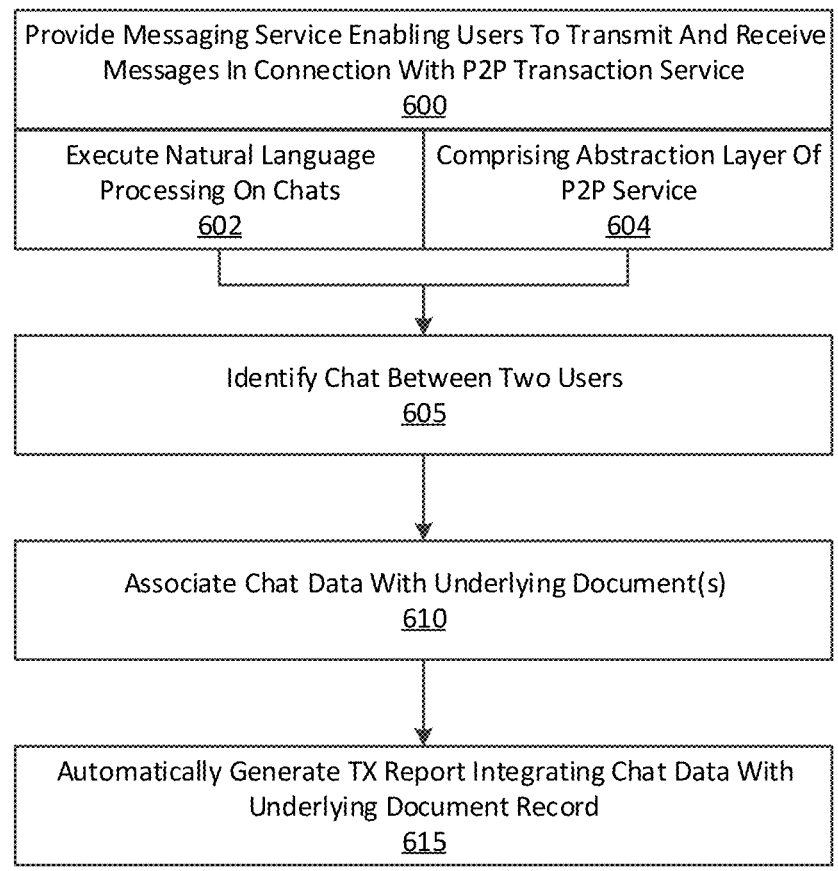
FIG. 6 is a flow chart describing an example method of linking messaging data with an underlying document record via an abstraction layer, according to various examples.

FIGS. 4, 5, and 6 are flow charts describing methods related to the automated, P2P transaction service described with respect to FIGS. 1 through 3. In the below discussion of FIGS. 4, 5, and 6, reference may be made to reference characters representing like features as shown and described with respect to FIGS. 1 through 3. Furthermore, the processes described with respect to the flow charts of FIGS. 4, 5, and 6 may be performed by an example computing system 100, 280 as shown and described with respect to FIGS. 1 and 2, a computing device 190, 200 executing a designated P2P transaction application 192, 232, or a combination of both. Still further, the steps represented by blocks in FIGS. 4, 5, and 6 need not be performed in any particular sequence or manner, and certain steps may be performed in unison, prior to, or subsequent to any other step shown in the flow charts of FIGS. 4, 5, and 6. FIG. 4 is a flow chart describing an example method of implemented an automated P2P transaction service, according to various examples. Referring to FIG. 4, the computing system 100 can manage or access a digital wallet for each user 197 of an automated P2P transaction service (400). In doing so, the computing system 100 can link the digital wallet to an external account of the user 197 (402) and associate the digital wallet with a randomized code (404).

Once a digital wallet is generated and linked to at least one external account of the user 197, the computing system 100 may then transmit display data to the user's computing device 190 (e.g., via an executing application 192) to cause the computing device 190 to generate a customized, interactive user interface 222 for the user 197 (405). In various examples, the user interface can generate a selectable authorization feature (407) and a P2P transaction request feature set that enables the user 197 to configure and transmit transaction requests and authorize automated transactions upon receiving requests from other users 197. When a request is received at the user's computing device 190, the computing system 100 may receive authorization data indicating that the user 197 has selected the authorization feature on the user interface 222 (410).

Upon receiving the authorization data, the computing system 100 can automatically execute a digital wallet transaction between the user 197 and a second user 197 associated with the request to the user 197 (415). As provided herein, the computing system 100 can maintain a records database 110 and a record manager 130 that can generate reconciliation reports (e.g., on a daily basis) for each financial institution 180 having an external account linked to a digital wallet managed by the computing system (420). For example, the computing system 100 can manage digital wallets linked to external accounts managed by any number of financially institutions 180, with each financial institution 180 having a unique record keeping format. For each financial institution, the record manager 130 can automatically map transaction data of the automated P2P transaction service with transaction records of the financial institution in connection with the automated P2P transaction service. Furthermore, the record manager 130 can map each field of the periodic report to the unique fields of the financial institution's own records.

FIG. 5 is a flow chart describing an example method of automated transaction execution based on transaction triggers of a messaging service, according to examples described herein. In an example described by the flow chart of FIG. 5, a computing system 100 can manage a digital wallet for each user 197 of an automated P2P transaction service (500). As described above, each digital wallet can be linked to at least one external account managed by at least one financial institution 180 (502), and can be associated with a randomized code representing a link between the digital wallet and each external account (504). In various implementations, the computing system 100 can provide a messaging service that enables the users 197 to transmit and receive messages in connection with the P2P transaction service (505). In various examples, the computing system 100 can perform natural language process on chats between users 197 to identify any transaction triggers to automatically execute transactions between the users 197 of a chat (510).

In certain implementations, the computing system 100 can identify, within a chat between a plurality of users 197, a transaction trigger (515). As described herein, a transaction trigger can comprise the necessary information required to automatically execute a wallet-to-wallet transaction. As such, the transaction data amounting to a transaction trigger can comprise an indication of transaction details, such as a date of transaction and a transaction amount (516). The transaction trigger can also include an affirmation by the payor to transfer the transaction amount to the payee in the chat (517). As further described herein, such transaction details can be parsed from an underlying document 320, such as a receipt, invoice, IOU, or image (518).

In various examples, once the transaction trigger is detected and the transaction data identified, the computing system 100 can automatically execute the digital wallet transaction between the two or more users 197 (520). As provided above, the record manager 130 can automatically compile the transaction data, including any comments in the chat and the relevant information on the underlying document 320, into a transaction record for the wallet-to-wallet transfer (525). In doing so, the computing system 100 can integrate the chat with the underlying document 320 to indicate that all necessary information had been provided for the automatic transaction to be executed. Thereafter, the transaction information may be incorporated into a reconciliation report for the relevant financial institutions 180 and/or the transaction record may be provided to the parties to the transaction on-demand (e.g., on an interface screen of the user interface 222).

FIG. 6 is a flow chart describing an example method of linking messaging data with an underlying document record via an abstraction layer, according to various examples. Referring to FIG. 6, the computing system 100 can provide a messaging service that enables users 197 to transmit and receive messages in connection with a P2P transaction service (600). In addition to performing natural language processing on chats within the message service to detect transaction triggers (602), the computing system 100 can implement the messaging service as an abstraction layer of the P2P transaction service (604). As such, the messaging service can operate in a normal messaging state in which general messages are transmitted between the users 197, and a transaction monitoring state when transaction trigger language or an underlying document 320 is present.

In such examples, the computing system 100 can transition from a passive detection mode in which certain transaction keywords or document associations in a chat can trigger the computing system 100 to execute more active language processing to monitor or parse the chat and/or underlying document 320 for transaction triggering information. According to examples described herein, the computing system 100 can identify a chat between two or more users 197 (605). The computing system 100 can associate the chat with one or more underlying documents 320, which can comprise any combination of images, receipts, IOUs, invoices, expense reports, and the like (610). Accordingly, for chats in which multiple documents are associated, the computing system 100 can execute language processing techniques described throughout the present disclosure to compile transaction data for a subsequent transaction execution event.

The computing system 100 may then generate a transaction report or record that integrates at least the relevant portions of the chat with at least the relevant portions of the underlying document 320 (615). In doing so, the computing system 100 can store a record for any transaction made using the automated P2P transaction service, with all relevant transaction data, such as amounts to be transferred, transaction date and/or time, payor/payee identifiers, affirmation by at least the payor, and the like.

Hardware Diagram

Figure 7:
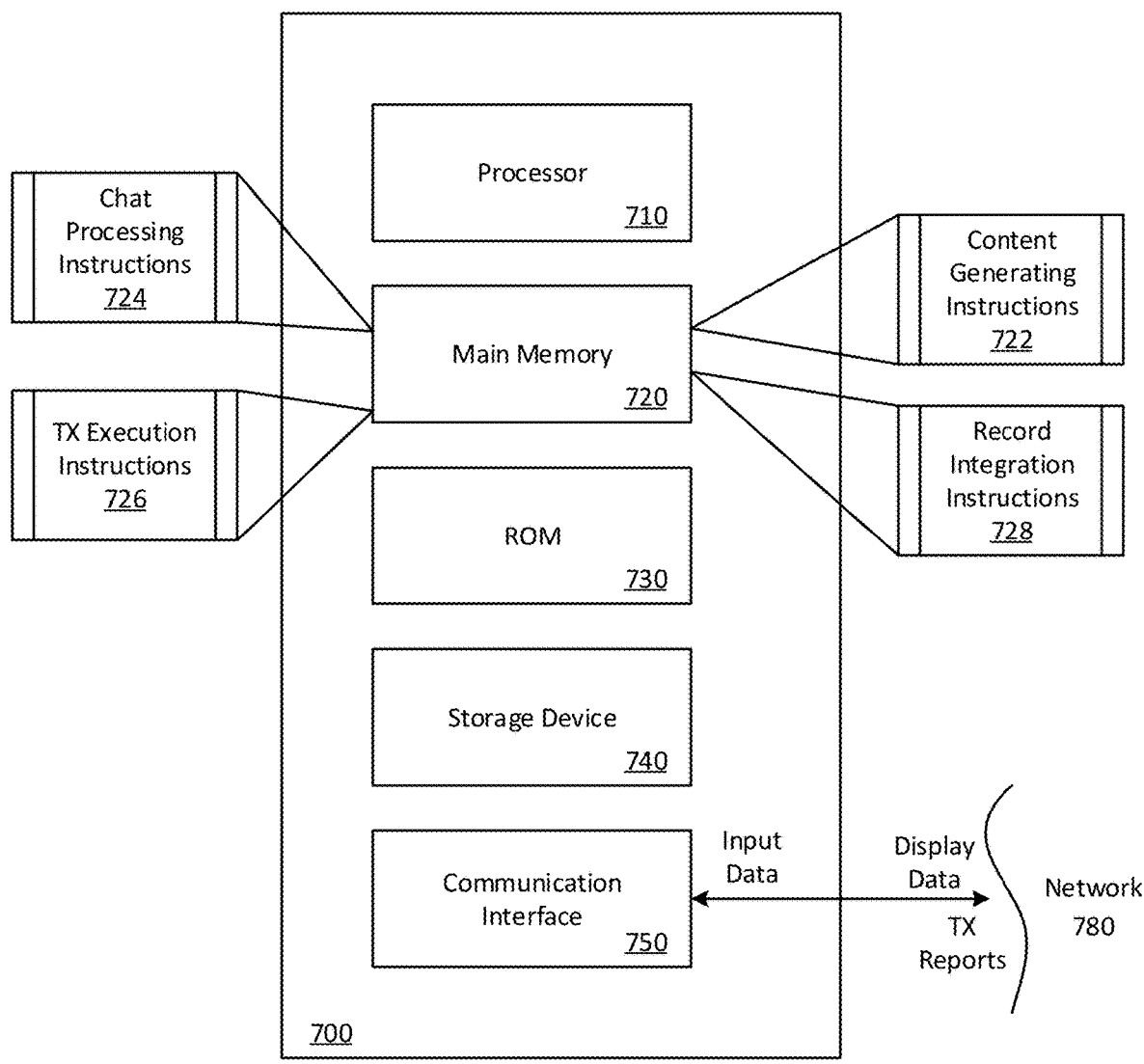
FIG. 7 is a block diagram illustrating a computing system upon which examples described herein can be implemented.

FIG. 7 is a block diagram that illustrates a computer system upon which examples described herein may be implemented. For example, in the context of FIG. 1, the computing system 100 may be implemented using a computer system 700 such as described by FIG. 7, or a combination of computer systems 700.

In one implementation, a computer system 700 includes processing resources 710, a main memory 720, a read-only memory (ROM) 730, a storage device 740, and a communication interface 750. The computer system 700 includes at least one processor 710 for processing information and instructions stored in the main memory 720, random access memory (RAM) or other dynamic storage device 740 that stores information and instructions to be executed by the processor 710. The main memory 720 also may be used for storing temporary variables or other intermediate information during execution of instructions to be executed by the processor 710. The computer system 700 may also include the ROM 730 or other static storage device 740 for storing static information and instructions for execution by the processor 710. The storage device 740, such as a magnetic disk, optical disk, external hard driver, etc. is provided for storing information and instructions, such as instructions to implement the P2P transaction service described throughout the present disclosure.

The communication interface 750 can enable the computer system 700 to communicate with one or more networks 780 (e.g., cellular network) through use of the network link (wireless or wired). Using the network link, the computer system 700 can communicate with one or more computing devices and/or one or more servers.

Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software. In examples provided, the instructions execute to initiate and implement the automated P2P transaction service, such as described with examples of FIGS. 1-6, on a server or network computer system.

In various implementations described herein, the executable instructions can comprise chat processing instructions 724, content generating instructions 722, transaction execution instructions 726, and record integration instructions 728. The processor 710 executes the content generating instructions 722 to generate display data that causes a customized, interactive user interface for each user to access and interact with the messaging and transaction services described herein. The processor 710 further executes the chat processing instructions 724 to process language and/or documents associated with a chat to detect transaction triggers in input data from the users' computing devices and determine the corresponding transaction data.

The processor 710 executes the transaction execution instructions 726 to automatically execute wallet-to-wallet transactions between users of the transaction service in response to transaction triggers being detected, or on-demand when directly requested and authorized by a plurality of users. The processor 710 executes the record integration instructions 728 to automatically associate an underlying document with chat comments or messages relevant to the execution of a resultant transaction, and provides transaction records and/or reconciliation reports in accordance with the examples provided above.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computer-implemented method of managing an automated peer-to-peer (P2P) transaction service, the method being performed by one or more processors and comprising:
   communicating, over one or more networks, to computing devices of a plurality of users of a messaging service;
   providing an interface for users of the messaging service to exchange messages with other users of the messaging service;
   detecting, in association with a message exchange between a first user and a second user of the messaging service, an underlying document from at least one of the first user or the second user, the underlying document comprising an attachment in the message exchange between the first user and the second user;
   based on detecting the attachment in the message exchange between the first user and the second user, execute text processing on the underlying document in the attachment to determine a set of parameters for a transaction between the first user and the second user;
   automatically execute the transaction using the set of parameters; and
   generating a transaction record confirming the executed transaction by archiving portions of the message exchange between the first user and the second user that are relevant to the transaction with the underlying document.

2. The method of claim 1, wherein the transaction record corresponds to a confirmation of the transaction executed between the first user and the second user.

3. The method of claim 2, wherein the messaging service comprises an abstraction layer of the automated P2P transaction service and initially operates in a normal messaging state for the first user and the second user, the method further comprising:
   executing natural language processing on the message exchange between the first user and the second user to detect transaction trigger language in the message exchange; and
   in response to detecting the transaction trigger language, initiating a transaction monitoring state for the message exchange between the first user and the second user to begin associating the message exchange with the underlying document.

4. The method of claim 3, wherein the abstraction layer of the messaging service corresponds to a passive detection mode that monitors the message exchange for transaction keywords or document associations when the messaging service operates in the normal messaging state and an active monitoring mode that parses the message exchange when the messaging service operates in the transaction monitoring state.

5. A computing system implementing an automated peer-to-peer (P2P) transaction service, comprising:
   network communication interface to communicate, over one or more networks, to computing devices of a plurality of users of a messaging service;
   one or more processors; and
   a memory storing instructions that, when executed by the one or more processors, causes the computing system to:
      provide an interface for users of the messaging service to exchange messages with other users of the messaging service;
      detect, in association with a message exchange between a first user and a second user of the messaging service, an underlying document from at least one of the first user or the second user, the underlying document comprising an attachment in the message exchange between the first user and the second user;
      based on detecting the attachment in the message exchange between the first user and the second user, execute text processing on the underlying document in the attachment to determine a set of parameters for a transaction between the first user and the second user;
      automatically execute the transaction using the set of parameters; and
      generate a transaction record confirming the executed transaction by archiving portions of the message exchange between the first user and the second user that are relevant to the transaction with the underlying document.

6. The computing system of claim 5, wherein the messaging service comprises an abstraction layer of the automated P2P transaction service.

7. The computing system of claim 6, wherein the messaging service initially operates in a normal messaging state for the first user and the second user, and wherein the executed instructions further cause the computing system to:
   execute natural language processing on the message exchange between the first user and the second user to detect transaction trigger language in the message exchange; and
   in response to detecting the transaction trigger language, initiate a transaction monitoring state for the message exchange between the first user and the second user to begin associating the message exchange with the underlying document.

8. The computing system of claim 7, wherein the abstraction layer of the messaging service corresponds to a passive detection mode when the messaging service operates in the normal messaging state and an active monitoring mode when the messaging service operates in the transaction monitoring state.

9. The computing system of claim 7, wherein the transaction is automatically executed based on initiating the transaction monitoring state for the message exchange between the first user and the second user and detecting an authorization to execute the transaction.

10. The computing system of claim 5, wherein the portions of the message exchange between the first user and the second user comprise at least one of a transaction amount, a payor, a payee, or a date.

11. A non-transitory computer readable medium storing instructions for implementing an automated peer-to-peer (P2P) transaction service, wherein the instructions, when executed by one or more processors of a computing system, cause the computing system to:
    communicate, over one or more networks, to computing devices of a plurality of users of a messaging service;
    provide an interface for users of the messaging service to exchange messages with other users of the messaging service;
    detect, in association with a message exchange between a first user and a second user of the messaging service, an underlying document from at least one of the first user or the second user, the underlying document comprising an attachment in the message exchange between the first user and the second user;
    based on detecting the attachment in the message exchange between the first user and the second user, execute text processing on the underlying document in the attachment to determine a set of parameters for a transaction between the first user and the second user;
    automatically execute the transaction using the set of parameters; and
    generate a transaction record confirming the executed transaction by archiving portions of the message exchange between the first user and the second user that are relevant to the transaction with the underlying document.

12. The non-transitory computer readable medium of claim 11, wherein the messaging service comprises an abstraction layer of the automated P2P transaction service.

13. The non-transitory computer readable medium of claim 12, wherein the messaging service initially operates in a normal messaging state for the first user and the second user, and wherein the executed instructions further cause the computing system to:
    execute natural language processing on the message exchange between the first user and the second user to detect transaction trigger language in the message exchange; and
    in response to detecting the transaction trigger language, initiate a transaction monitoring state for the message exchange between the first user and the second user to begin associating the message exchange with the underlying document.

14. The non-transitory computer readable medium of claim 13, wherein the abstraction layer of the messaging service corresponds to a passive detection mode when the messaging service operates in the normal messaging state and an active monitoring mode when the messaging service operates in the transaction monitoring state.

15. The non-transitory computer readable medium of claim 13, wherein the transaction is automatically executed based on initiating the transaction monitoring state for the message exchange between the first user and the second user and detecting an authorization to execute the transaction.

16. The non-transitory computer readable medium of claim 11, wherein the portions of the message exchange between the first user and the second user comprise at least one of a transaction amount, a payor, a payee, or a date.

* * * * *